United States Patent Office 3,227,699
Patented Jan. 4, 1966

3,227,699
METHOD FOR IMPROVING THE PROCESSABILITY AND EXTRUDABILITY OF OLEFIN POLYMERS
Frank Rendon and Gaylon T. Click, Pasadena, Tex., assignors to Phillips Petroleum Company, a corporation of Delaware
No Drawing. Filed Aug. 14, 1961, Ser. No. 131,062
5 Claims. (Cl. 260—88.2)

This invention relates to polymers of 1-olefins. In one aspect, this invention relates to the processability and extrudability of polymers of 1-olefins. In another aspect, this invention relates to controlling the processability and extrudability of polymers of 1-olefins.

It is known in the art that monoolefins having from 2 to 8 carbon atoms per molecule and no chain branching nearer the double bond than the 4-position can be polymerized in the presence of a catalyst containing chromium oxide, at least a portion of the chromium being in the hexavalent state, to high molecular weight polymers. Such a process is described in detail in the patent to J. P. Hogan et al., U.S. 2,825,721, issued March 4, 1958. In the continuous process the reaction can be carried out in solution employing a hydrocarbon diluent and introducing the catalyst to the reactor in the form of a slurry. Ethylene is flashed from the reactor effluent and the solution is filtered to remove solid catalyst. Polymer is then recovered from the solution.

Recently it has been discovered that there is a critical polymerization temperature range within the broad range disclosed by Hogan et al. in which it is possible to produce increased yields of high molecular weight polymers of ethylene which are insoluble in the hydrocarbon diluent. This polymer is formed in association with the polymerization catalyst and is suspended in the liquid diluent in solid particle form. The preparation of insoluble particle form polymer is disclosed in the copending application of Leatherman et al., Serial No. 590,567, filed June 11, 1956, and now abandoned. In the following discussion the term "particle form polymer" refers to the insoluble polymers of ethylene formed in accordance with the Leatherman et al. application.

It has been found that these high molecular weight polymers of 1-olefins are frequently difficult to further process by conventional methods such as extruding. Several methods are known to the art for determining the capabilities of the polymer for further processing and extruding. One suitable method is the determination of flow when subjected to high shear pressures. The subjection of the polymer to high shear and the determination of flow characteristics under such conditions is necessary in order to duplicate as nearly as possible the ultimate extrudability and processability of the polymer under commercial conditions. One well-known method of determining flow under high shear conditions is known as CIL flow which as hereinafter described is determined by the use of a rheometer developed by Canadian Industries, Ltd. (described more fully in J. Applied Physics 28, E. B. Bagley, May 1957), which is a capillary type machine capable of operating in the temperature range of 257 to 600° F. Pressures up to 2500 p.s.i. are supplied by a nitrogen cylinder. Unless otherwise specified, the data contained herein were taken at 500° F. and 1000 p.s.i. The capillary used to collect the data had a diameter of 0.01925 inch and a length of 0.176 inch. In operation molten polymer is extruded through the capillary and the extrusion rate in grams per minute is determined. The reproducibility of extrusion rates is ±5 percent.

It is an object of this invention to provide an improved method for the polymerization of 1-olefins. It is another object of this invention to provide an improved method for controlling the polymerization of 1-olefins. It is yet another object of this invention to provide an improved method for controlling the physical characteristics of a polymer of a 1-olefin. It is yet another object of this invention to provide an improved method for controlling the flow characteristics of a polymer of a 1-olefin under high shear conditions. Other objects, advantages and features of this invention will be apparent to those skilled in the art from the following specification, claims and description.

These objects are broadly acomplished in a process for the polymerization of 1-olefins in a polymerization zone in the presence of a catalyst active for such polymerization by the improvement which comprises introducing into said zone a treating agent in an amount sufficient to control the extrudability and processability of the polymer product.

In its broad aspect, the invention is concerned with the polymerization of 1-olefins, most frequently, a 1-olefin having from 2 to 8 carbon atoms per molecule and no chain branching nearer the double bond than the 4-position. Examples of 1-olefins which are polymerizable include ethylene, propylene, 1-butene, 1-pentene, 1-hexene and the like. The term "polymer," as used herein, is intended to include both homopolymers and copolymers. Particularly useful and applicable copolymers are ethylene-propylene and ethylene-1-butene. This invention is especially advantageous for the copolymerization of ethylene and 1-butene.

Many methods have been described in the art for the production of polymers of 1-olefins including those hereinbefore described relative to the patents of Hogan et al. and Leatherman et al., supra. The invention is not limited to any particular method by which the polymer is produced and includes methods by which the polymer is produced in solution, in a diluent in which the polymer is insoluble and by the polymerization of the monomer in either the vapor phase or in the absence of a diluent.

The catalysts to which our invention applies include those described in the above-mentioned patent to J. P. Hogan et al. These catalyst comprise chromium oxide containing hexavalent chromium and silica, alumina, thoria, zirconia or composites thereof and can be prepared by impregnating the carrier material with aqueous solutions of salts of chromium. The catalyst can then be dried and activated at a temperature in the range of 450° to 1500° F., preferably under nonreducing conditions for several hours. The hexavalent chromium content of the activated catalyst should be at least 0.1 percent by weight. Our invention also applies to polymerization reactions employing an ethylene feed and a mixed catalyst of chromium oxide and nickel oxide or cobalt oxide supported on a suitable carrier such as silica, alumina, thoria, zirconia or composites thereof.

Suitable diluent are paraffins having about 3 to 12 carbon atoms per molecule such as propane, isobutane, n-pentane, isopentane, isooctane, decane, dodecane, and the like. Preferably those paraffins having at least 5 carbon atoms per molecule are used. The cycloparaffins, such as cyclohexane and methyl cyclohexane, are also suitable. In addition to the foregoing, other hydrocarbon diluents which are relatively inert and in the liquid state under the reaction conditions can be employed. In general, the quantity of the diluent is relatively large in relation to the olefin feed. For example, the olefin feed usually constitutes about 0.1 to about 25 percent by weight of the mixture.

However, to simplify the description of the invention, the description herein is generally limited to a discussion of solution-type polymerization of ethylene with 1-butene.

The mechanism of this invention is not completely understood. It has been found that by the introduction of the treating agent into the polymerization zone, such as by the addition of treating agent to the diluents prior to the introduction of the same into the polymerization zone, the CIL flow of the thus-produced polymer is controllable. Thus, by controlling the CIL flow within the desired range, the extrudability and processability of the polymer product is maintained within the desired range.

The control of the "extrudability factor" is an important consideration for many applications. Thus, it has been found that polymers having substantially identical densities, crystallinities and melt indices frequently exhibit widely varying characteristics under high shear conditions such as experienced in extrusion molding. For instance, a particle form polymer produced by the method of Leatherman et al, supra, having a melt index of 0.3 preferably has a CIL flow in the range 2.0 to 2.3 when the polymer is to be used for the production of bottles, but when fiber is to be produced the preferred CIL flow is about 1.7, even though the polymers have identical densities. In general, if the CIL is low, a higher temperature is needed for a particular extrusion rate; however, the temperature must be kept below the point at which substantial visbreaking occurs, so as not to reduce impact strength, etc.

A number of treating agents are employable although cyclopentanone, cyclohexanone, and cycloheptanone are preferred. It is generally not detrimental for the treating agent to contain other carbonyls, e.g. acetaldehyde, propyl aldehyde and butyl aldehyde. The amount of the treating agent required to maintain the CIL flow (extrudability and processability indicator) within the desired limit depends upon the particular catalyst used, the reaction conditions, and the like. The amount of treating agent required varies from 0.01 to 20 volume parts per million based on total volume of the reactor contents, preferably 0.1 to 10 parts per million depending on the activity of the catalyst.

The treating agent may be introduced into the polymerization zone by any suitable means such as by direct injection or by inclusion of the treating agent with the solvent or olefin feed.

Preferably, the extrudability and processability characteristics of the polymer product, as determined by CIL flow determinations, are maintained substantially constant; however, it is generally better practice to set forth boundaries within which this CIL flow should be maintained in lieu of continual and mechanical adjustment of the amount of treating agent being added to the polymerization zone proportional to the CIL flow of monomer product.

As an example of the manner in which our invention serves to provide uniform polymerization zone conditions and thus uniform polymer quality, the following specific examples are presented. In the following examples, the physical characteristics of the polymer were determined on a polymer sample which had been filtered to remove solvent, dried in a vacuum oven for 16 hours at 190° F., blended with antioxidant, and dried in a vacuum oven at 190° F.

EXAMPLE I

Ethylene and 1-butene are copolymerized in cyclohexane diluent in the presence of a chromium oxide catalyst (2.5 weight percent chromium and a 90/10 silica/alumina support) activated by the method of Hogan et al, supra. The reactor is maintained at a temperature of approximately 267° F. and a reactor pressure of 315 p.s.i.a. Ninety-seven pounds of ethylene and 7 pounds of butene-1 are introduced into the reactor along with 1,000 pounds per hour of cyclohexane. Accompanying a portion of the cyclohexane is the catalyst as hereinafter set forth in Table I. Seventy pounds of copolymer are produced having a melt index and CIL flow as hereinafter set forth in Table I.

*Table I*

EFFECT OF CYCLOHEXANONE ON M.I. AND CIL

| P.p.m. Cyclohexanone in Solvent | CIL | Percent CIL Deviation From Normal[1] | M.I.[2] |
|---|---|---|---|
| 0 | 7.74 | +3 | 2.88 |
| 0 | 9.93 | −5 | 3.70 |
| 0 | 11.74 | 0 | 7.35 |
| 1.5 | 7.88 | +20 | 1.92 |
| 1.5 | 7.70 | +13 | 2.16 |
| 1.5 | 6.87 | +13 | 1.81 |
| 3.0 | 4.49 | +10 | 1.05 |
| 3.0 | 9.37 | +18 | 2.70 |

[1] The CIL of a large number of runs were plotted against their melt indices, the average determination was considered the "normal" value, and the deviation from this value was calculated in percent.
[2] For melt index, the method of ASTM D-1238-52T is used with 5 runs being run at 2 minute intervals, averaging the 5 weights, discarding any values which deviate from the average by more than 5 weight percent, reaveraging and multiplying by 5 to obtain the amount of extrudate in 10 minutes. If the melt index is low, such as less than 1.0, the high load melt index may be obtained by ASTM D-1238-57T (Procedure 5) using a weight of 21,600 grams.

It will be noted from the above table that as cyclohexanone is added to the reactor, the percent CIL deviation from normal is increased appreciably.

EXAMPLE II

Additional runs were made in which the reaction conditions of Example I were duplicated except that the amount of carbonyls (including cyclohexanone) varied.

*Table II*

COMPARISON OF POLYMERS MADE

| 0.0 p.p.m. Carbonyls[1] | | | 2.0 p.p.m. Carbonyls[1] | | |
|---|---|---|---|---|---|
| M.I. | CIL | Percent CIL Deviation From Normal | M.I. | CIL | Percent CIL Deviation From Normal |
| 7.35 | 11.74 | 0 | 3.91 | 12.92 | +33 |
| 3.70 | 9.93 | +3 | 2.30 | 9.16 | +23 |
| 2.88 | 7.74 | −5 | 1.02 | 5.15 | +27 |
|  |  |  | .88 | 4.41 | +19 |

[1] Calculated as cyclohexanone.

It will be noted from the above table that when the diluent had 0.0 part per million carbonyls* (including cyclohexanone) that the percent CIL deviation from normal was substantially nil, whereas when 2.0 parts per million carbonyls were present the CIL increased from normal by a substantial amount.

EXAMPLE III

The reactor conditions of Example I were duplicated and diluent containing 2000 parts per million of cyclohexanone were metered into the reactor at a rate of 20 cc. per minute. Samples of the polymer product were taken every 8 hours, filtered to remove most of the solvent, dried in a vacuum oven for 16 hours at 190° F., blended with 0.10 percent antioxidant, and dried for one \* Calculated as cyclohexanone.

hour in a vacuum oven at 190° F. CIL flow and melt index were then detemrined and tabulated as set forth in Table III.

*Table III*

EFFECT OF CYCLOHEXANONE ADDITION ON ETHYLENE-BUTENE-1 POLYMER

| P.p.m. Cyclohexanone Added | CIL | M.I. | Percent CIL Deviation From Normal [1] |
|---|---|---|---|
| 0.00 | 1.70 | .24 |  |
| 0.31 | 2.22 | .29 | 16 |
| 0.00 | 2.33 | .40 |  |
| 0.39 | 2.27 | .33 | 15 |
| 0.00 | 2.42 | .44 |  |
| 0.50 | 2.62 | .33 | 29 |
| 0.00 | 2.06 | .33 |  |

[1] As described in Example I.

It will be seen from Table III that as the amount of cyclohexanone added to the reactor was increased, the deviation of CIL flow from normal increased approximately proportional thereto.

While certain examples, structures, compositions and process steps have been described for purposes of illustration, the invention is not limited to these. Variation and modification within the scope of the disclosure and the claims can readily be effected by those skilled in the art.

We claim:

1. A process for the polymerization of a 1-olefin selected from the group consisting of 1-olefins containing from 2 to 8 carbon atoms per molecule and no chain branching nearer the double bond than the 4 position comprising contacting said 1-olefin in a polymerization zone under polymerization conditions with a catalyst comprising chromium oxide and at least one material selected from the group consisting of silica, alumina, zirconia and thoria, at least part of the chromium being in the hexavalent state at the initial contacting of hydrocarbon with said catalyst, and in the presence of a treating agent selected from the group consisting of cyclopentanone, cyclohexanone and cycloheptanone in an amount sufficient to maintain substantially constant extrudability and processability characteristics, as measured by CIL flow, of the thus produced polymer product.

2. The process of claim 1 wherein said 1-olefin comprises a mixture of ethylene and 1-butene.

3. The process of claim 1 wherein said amount is in the range of 0.01 to 20 volume parts per million based on total volume of the contents of said zone.

4. The process of claim 1 wherein said treating agent comprises cyclohexanone.

5. A process for the copolymerization of monomers comprising ethylene and 1-butene comprising contacting said monomers in a polymerization zone maintained under polymerization conditions in the presence of a hydrocarbon diluent and a catalyst comprising chromium oxide and at least one material selected from the group consisting of silica, alumina, zirconia and thoria, at least part of the chromium being in the hexavalent state at the initial contacting of hydrocarbon with said catalyst, and in the further presence of cyclohexanone in an amount in the range of 0.01 to 20.0 volume parts per million based on total volume of contents of said zone and sufficient to maintain substantially constant the extrudability and processability characteristics, as measured by CIL flow, of said polymer.

References Cited by the Examiner

UNITED STATES PATENTS

| 2,402,137 | 6/1946 | Hanford et al. | 260—488 |
| 2,881,156 | 4/1959 | Pilar et al. | 260—94.9 |
| 3,076,776 | 2/1963 | Findlay | 260—33.4 |

JOSEPH L. SCHOFER, *Primary Examiner.*